United States Patent Office 3,169,958
Patented Feb. 16, 1965

3,169,958
3-OXYGENATED-5α-HALOGEN-6β:19-OXIDO-PREGNANES
Albert Wettstein, Riehen, Georg Anner, Karl Heusler, and Jaroslav Kalvoda, Basel, Hellmut Ueberwasser, Riehen, and Jules Heer, Binningen, Switzerland, assignors to Ciba Corporation, New York, N.Y., a corporation of Delaware
No Drawing. Filed Sept. 7, 1962, Ser. No. 222,227
Claims priority, application Switzerland, June 2, 1961, 6,479/61; June 13, 1961, 6,895/61; Sept. 18, 1961, 10,803/61; Sept. 22, 1961, 11,071/61; Jan. 9, 1962, 185/62
22 Claims. (Cl. 260—239.55)

This application is a continuation-in-part of our co-pending application Ser. No. 122,657, filed July 10, 1961, by Albert Wettstein et al., now abandoned.

The present invention relates to novel 3-oxygenated 5α-halogen-6β:19-oxido-pregnanes, more especially to compounds of the formula

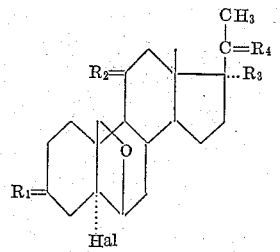

wherein $R_1$ stands for oxo or a hydrogen atom together with hydroxy or acyloxy,
$R_2$ stands for hydrogen, oxo or hydrogen together with hydroxy or acyloxy,
$R_3$ stands for hydrogen, hydroxy, acyloxy or a 16α:17α-epoxide grouping,
$R_4$ stands for oxo or hydrogen together with hydroxy or acyloxy,
Hal stands for a halogen atom with an atomic weight above 30, especially chlorine or bromine.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenantic, decanoic, trifluoroacetic, carbonic-monomethylester or carbonic monoethylester, hexahydrobenzoic, acylpentylpropionic, phenylpropionic, benzoic or furoic acid.

The compounds of the present invention are extremely useful intermediates for the production of 19-nor-pregnanes to which class of compounds belong several well known progestational agents such as 19-nor-progesterone, 17α-hydroxy-19-nor-progesterone and especially its esters, 6-dehydro-19-nor-progesterone etc. From the compounds of the invention other 19-oxygenated pregnanes can be prepared which in themselves are important, e.g., 6β:19-oxido-11-oxo-progesterone and 19-oxo-progesterone are capable of protecting against bacterial endotoxins.

The further transformation of the products of the invention into these physiologically active compounds is performed as follows: The $R_1$ substituent is converted into an oxo group and by elimination of hydrohalic acid under the influence of pyridine or sodium acetate gives the $\Delta^4$-3-oxo-6β:19-oxido-pregnenes. These may be reduced with zinc and acetic acid at slightly elevated temperature and in the $\Delta^4$-3-oxo-19-hydroxy-pregnenes produced the argular C–19-substituent may be eliminated in known manner, preferable after oxidizing the 19-hydroxy group to an aldehyde or acid function.

Among the 5-halogen-6β:19-oxido-pregnanes of the invention the following are particularly important: 3β:20-dihydroxy-5α-chloro- or -bromo-6β:19-oxido-pregnane, 3β-hydroxy-5α-chloro- or -bromo-6β:19-oxido-20-oxo-pregnane, 3β-hydroxy-5α-chloro- or -bromo-6β:19; 16:17α-bisoxido-20-oxo-pregnane, 3β:17α-dihydroxy-5α-chloro- or -bromo-6β:19-oxido-20-oxo-pregnane and its 17 esters or 3α:5α-dihydroxy-6β:19-oxido-20-oxo-pregnane; the corresponding 3-oxo compounds, such as 3:20-dioxo-5α-chloro- or 5α-bromo-6β:19-oxido-pregnane, 3:20-dioxo-5α-chloro- or 5α-bromo-6β:19-oxido-17α-hydroxy-pregnene or 11-oxygenated-6β:19-oxido-pregnanes, such as 3β:11α:20-trihydroxy-5α-chloro- or 5α-bromo-6β:19-oxido-pregnane.

The pregnanes of the present invention are obtained either by treating a 5α-halogen-6β-hydroxy-pregnane with lead tetraacetate in boiling benzene or cyclohexane for several hours or by reacting a 5α-halogen-6β-hydroxy-pregnane in boiling cyclohexane solution with monovalent, positive iodine preferable in the presence of free iodine and strong visible light for 10 to 90 minutes. The monovalent positive iodine may be obtained from N-iodo-succinimide or from silver acetate and iodine or mercuric acetate and iodine. An especially efficient method for the preparation of the 5α-halogen-6β:19-oxido-pregnane consists in treating a 5α-halogen-6β-hydroxy pregnane in an apolar solvent, e.g., in boiling cyclohexane solution with lead tetraacetate and iodine. The 5α-halogen-6β:19-oxido grouping formed in the above mentioned reactions is stable under both alkaline and acidic conditions. Ester groupings, e.g., in 3:11:17- and/or 20-positions may therefore be hydrolyzed in the usual manner, ketal groupings, e.g., in 3- and/or 20-positions may be cleaved by acid treatment and hydroxyl groups formed, e.g., in 3:11- and/or 20-positions may be oxidized to oxo groups. It is even possible to reduce oxo groups present, e.g., in 11-and/or 20-positions with lithium aluminum hydride or sodium borohydride without affecting the 6β:19-oxide. It is even possible to introduce a 17α-hydroxy group into 17-unsubstituted 20-ketones by the enolacylate-peracid metal without undesired side reactions at the site of the 6β:19-oxide.

The 5α-halogen-6β-hydroxy-pregnanes used as starting materials are prepared from the corresponding 5:6-unsaturated pregnenes by the addition of hypohalous acid, especially by addition of hypochlorous or hypobromous acid.

The following examples illustrate the invention. The temperatures are given in centigrades.

*Example 1*

A suspension of 10 grams of calcium carbonate and 30 grams of lead tetraacetate in 1 liter of cyclohexane is heated to 80° C., treated with 8.0 grams of iodine and then with 5 grams of 3β:20β-diacetoxy-5α-chloro-6β-hydroxy-5α-pregnane and the reaction mixture is refluxed for 3 hours and then cooled and filtered. The residue is washed with ether, the filtrate extracted with sodium thiosulfate solution of 10% strength, dried and evaporated under reduced pressure, to yield 6.1 grams of a solid crude product which on crystallization from acetone+hexane yields pure 3β:20β-diacetoxy-5α-chloro-6β:19-oxido-5α-pregnane melting at 148 to 150° C. Optical rotation $[\alpha]_D = +25°$ (in chloroform).

A solution of 4.0 grams of this compound in methanol is treated with 4.0 grams of potassium carbonate and water and refluxed for one hour, then evaporated in a water-jet vacuum and from the residue the crude 3β:20β-dihydroxy-5α-chloro-6β:19-oxido-5α-pregnane melting at 237 to 240° C. is isolated in the usual manner.

Example 2

(a) A suspension of 110 grams of lead tetraacetate and 50 grams of dry calcium carbonate in 4.5 liters of cyclohexane is stirred for about 40 minutes at the boil. 25 grams of 3β-acetoxy-5α-chloro-6β-hydroxy-20-oxo-pregnane and 32 grams of iodine are then added and the solution is kept at the boil while being irradiated with a 1000 watt lamp and stirred until the color of iodine has completely disappeared (about 30 to 90 minutes). The whole is then cooled, the undissolved salts are filtered off and the filter residue is rinsed with cyclohexane. The filtrate is washed with dilute sodium thiosulfate solution and with water, dried and evaporated in a water-jet vacuum. Crystallization of the crude product from ether yields 19.2 grams of pure 3β-acetoxy-5α-chloro-6β:19-oxido-20-oxo-pregnane melting at 150 to 153° C. From the mother liquor another 3.3 grams of a slightly less pure substance can be isolated. Optical rotation of the pure compound $[\alpha]_D = +65°$ (in chloroform). Its infra-red spectrum contains bands, inter alia, at 5.78, 5.88, 6.70, 8.13, 9.12, 9.66, 10.60, 10.86 and 11.75μ.

In an analogous manner there are obtained

From 3β:17α-diacetoxy-5α-chloro-6β-hydroxy-20-oxo-pregnane the 3β:17α-diacetoxy-5α-chloro-6β:19-oxido-20-oxo-pregnane melting at 187 to 187.5° C., From 3β-acetoxy-5α-chloro-6β-hydroxy-17α-valerianyloxy-20-oxo-pregnane the 3β-acetoxy-5α-chloro-6β:19-oxido-17α-valerianyloxy-20-oxo-pregnane, and From 3β-acetoxy-5α-chloro-6β-hydroxy-17α-methoxy-20-oxo-pregnane the 3β-acetoxy-5α-chloro-6β:19-oxido-17α-methoxy-20-oxo-pregnane.

The chlorohydrin used as starting material is prepared in the following manner: A solution of 150 grams of pregnenolone acetate in 5 liters of ether is treated with 150 grams of chlorinated lime (containing 30% of active chlorine) and 8.2 liters of water and the reaction mixture is vigorously stirred. After 5 minutes 105 cc. of glacial acetic acid and after another 25 minutes 500 cc. of potassium iodide solution of 10% strength are added. Finally, the aqueous phase is separated, and the ethereal solution is washed with sodium thiosulfate solution of 10% strength, dilute sodium bicarbonate solution and with water, dried and evaporated in a water-jet vacuum. The residue is treated with 800 cc. of acetone and kept overnight at 0° C., to yield 47.5 grams, and from the mother liquor another 58 grams, of 3β-acetoxy-5α-chloro-6β-hydroxy-20-oxo-pregnane which melts at 196 to 197° C. after recrystallization from acetone. Optical rotation $[\alpha]_D = +25.5°$ (in chloroform). The infra-red spectrum of the compound displays bands, inter alia, at 2.75, 5.78, 5.88, 8.12, 8.68, 9.68 and 9.72μ.

In an analogous manner addition of hypochlorous acid on to the 17α-acetoxy-pregneneolone acetate yields 3β:17α-diacetoxy-5α-chloro-6β-hydroxy-20-oxo-pregnane.

(b) 10.0 grams of 3β-acetoxy-5α-chloro-6β:19-oxido-20-oxo-pregnane in 180 cc. of acetic anhydride are treated with 4.0 grams of para-toluenesulfonic acid and heated in a bath maintained at 140 to 150° C. for 4 hours under a pressure of 50 to 60 mm. Hg, during which 90 cc. of solvent are distilled off. The reaction mixture is cooled, poured over ice and water and extracted with a 3:1-mixture of ether and methylene chloride. The extracts are washed with sodium bicarbonate solution and with water, dried and evaporated. The residue (10.40 grams) is dissolved in benzene and the solution is filtered through 100 grams of alumina. The eluates yield 10.1 grams of crude product which still contain about 15% of starting material. Crystallization from methylene chloride+ether+petroleum ether yields pure $\Delta^{17(20)}$-3β:20-diacetoxy-5α-chloro-6β:19-oxido-pregnene melting at 171 to 172° C. Optical rotation $[\alpha]_D = +18.4°$ (in chloroform). The infra-red spectrum of the compound contains bands, inter alia, at 5.76, 6.70, 7.30, 8.16, 9.13, 10.60 and 10.87μ.

A solution of 10.1 grams of crude $\Delta^{17(20)}$-3β:20-diacetoxy-5α-chloro-6β:19-oxido-pregnene in 250 cc. of benzene is treated with 240 cc. of an ethereal solution of perbenzoic acid (containing 2 molecular equivalents of peracid calculated on the enol acetate) and kept for 5 hours at room temperature, after which time 70.2% of the amount of per-acid calculated for complete oxidation has been consumed. The reaction mixture is diluted with ice water, extracted with ether and the extracts are washed with water, sodium bicarbonate solution and water. The dried ethereal solution yields 9.90 grams of crude epoxide. After recrystallization from methylene chloride+ether pure 3β:20-diacetoxy-5α-chloro-6β:19; 17α:20-bisoxido-pregnane melts at 192 to 194° C. Optical rotation $[\alpha]_D = +14.4°$ (in chloroform). The infra-red spectrum of the compound contains bands, inter alia, at 5.76, 6.70, 7.30, 8.13, 8.58, 9.67, 10.66 and 10.81μ.

A mixture of 10.0 grams of crude 3β:20-diacetoxy-5α-chloro-6β:19;17α:20-bisoxido-pregnane, 800 cc. of alcohol and 45 cc. of aqueous sodium hydroxide solution of 2.4% strength is kept for one hour at room temperature, treated with 500 cc. of water and concentrated in a water-jet vacuum to half the volume. The concentrate is heated for 3 hours at 60° C., and the precipitate is filtered off, thoroughly washed with water and the filter residue is dried, to yield 9.85 grams of crude product which after crystallization from methylene chloride+methanol yields 3.90 grams of pure 3β:17α-dihydroxy-5α-chloro-6β:19-oxido-20-oxo-pregnane melting at 251 to 253° C. Optical rotation $[\alpha]_D = +22.4°$ (in chloroform+alcohol). From the mother liquor another compound separates out which melts at 251 to 253° C.; it is probably a rearrangement product of the above diol.

A mixture of 200 mg. of 3β:17α-dihydroxy-5α-chloro-6β:19-oxido-20-oxo-pregnane, 1.0 cc. of acetic anhydride and 1.0 cc. of pyridine is stirred for 14 hours, with the starting material slowly passing into soltuion. The solution is then poured into ice water and extracted with a mixture of ether and methylene chloride. The extracts are washed with water, hydrochloric acid, sodium bicarbonate solution and with water and dried, to yield 210 mg. of crude product which is crystallized from ether+petroleum ether to yield 185 mg. of pure 3β-acetoxy-5α-chloro-6β:19-oxido-17α-hydroxy-20-oxopregnane melting at 166 to 167° C. Occasionally, the compound is obtained in a crystalline modification melting up to about 175° C. Optical rotation $[\alpha]_D = -2.1°$ (in chloroform). Its infra-red spectrum contains bands, inter alia, at 2.74, 2.82, 5.76, 5.85, 6.69, 7.30, 8.10, 9.65 and 10.86μ.

A mixture of 100 mg. of 3β:17α-dihydroxy-5α-chloro-6β:19-oxido-20-oxo-pregnane, 1.0 cc. of acetic anhydride and 100 mg. of para-toluene sulfonic acid is stirred for 2½ hours at 40° C., then poured into a mixture of 50 cc. of ice water and 0.5 cc. of pyridine, diluted with ether after 10 minutes, and the extracts are washed with sodium bicarbonate solution and with water. Recrystallization of the evaporation residue (106 mg.) from ether+petroleum ether yields 98 mg. of pure 3β:17α-diacetoxy-5α-chloro-6β:19-oxido-20-oxo-pregnane melting at 187 to 187.5° C. Optical rotation $[\alpha]_D = -6.2°$ (in chloroform). The infra-red spectrum of the compound contains bands, inter alia, at 5.77, 6.68, 7.79, 8.10, 9.65, 10.39 and 10.85μ.

The identical compound can also be prepared by acetylating 4.0 grams of 3β-acetoxy-5α-chloro-6β:19-oxido-17α-hydroxy-20-oxo-pregnane for 2½ hours at 40 to 50° C. in 40 cc. of acetic anhydride with addition of 4.0 grams of para-toluenesulfonic acid. The reaction mixture is cooled, poured into a mixture of 1 liter of ice water and 10 cc. of pyridine, the whole is stirred for 15 minutes and the precipitate is filtered off, washed with water, taken up in ether, and the solution is washed until it is neutral, dried and evaporated. The residue (3.85 grams) yield on crystallization from ether+petroleum ether 3.0 grams of 3β:17α-diacetoxy-5α-chloro-6β:19-oxido-20-oxo-pregnane melting at 187 to 187.5° C.

A mixture of 2.8 grams of the latter compound, 100 cc. of methanol and 500 mg. of potassium carbonate is stirred in 2.5 cc. of water for 13 hours at room temperature, then diluted with water, the methanol is distilled off in a water-jet vacuum, the residue is extracted with ether, and the extracts are washed with water, dried and evaporated. The residue (2.52 grams) yields on crystallization from methylene chloride+methanol 1.98 grams of 3β-hydroxy-5α-chloro-6β:19-oxido - 17α - acetoxy - 20-oxo-pregnane melting at 238 to 241° C. After one recrystallization the melting point rises to 243 to 245° C.

A solution of 425 mg. of this compound in 15 cc. of acetone is treated at −5 to −6° C. with 0.5 cc. of a solution, diluted with water to 50 cc., of 13.3 grams chromium trioxide in 11.5 cc. of concentrated sulfuric acid. The whole is stirred for 30 minutes at −5° C., and a solution of 5.5 grams of crystalline sodium acetate in 10 cc. of water and 35 cc. of benzene is added. The organic phase is separated, washed with semi-saturated sodium chloride solution, dried and evaporated in a water-jet vacuum, to yield 450 mg. of crude 3:20-dioxo-5α-chloro-6β:19-oxido-17α - acetoxy - pregnane. The pure compound, obtained by recrystallization from methylene chloride+petroleum ether, melts at 156 to 158° C. with decomposition, then solidifies again and melts finally at 185 to 190° C. The infra-red spectrum of the compound contains bands, inter alia, at 5.84, 6.75, 6.82, 7.35, 8.15, 8.30, 9.10, 9.32, 9.70, 10.35 and 11.00μ.

*Example 3*

10 grams of 3β:20-diacetoxy-5α-chloro-6β:19;17α:20-bisoxido-pregnane (prepared as described above) are treated with 100 cc. of a 2:1-mixture of glacial acetic acid and water and the whole is heated for one hour on a boiling water bath, then cooled, treated with 250 cc. of water and the acetic acid is distilled off under reduced pressure. The residue is taken up in a mixture of methylene chloride and ether, and the solution is washed with water, dried and evaporated. The resulting residue is dissolved with heating in methanol and then left to itself, whereupon 4.2 grams of crystalline 3β-acetoxy-5α-chloro-6β:19-oxido-17α-hydroxy-20-oxo-pregnane are obtained. The pure product, obtained by chromatography on silica gel and crystallization from methylene chloride+methanol, melts at 175 to 176° C.

*Example 4*

As described in Examples 1, Part (a) and 2, Part (a), the cyclic 3α:5α-carbonate obtained from 3α:5α:6β-trihydroxy-20-oxo-pregnane by a known method by reaction with phosgene in toluene is converted into the corresponding oxido compound, namely the cyclic 3α:5α-carbonate of 3α:5α-dihydroxy-6β:19-oxido-20-oxo-pregnane.

*Example 5*

5.0 grams of the 18:20-lactone of 3β-acetoxy-5α-chloro-6β:20-dihydroxy-5α-pregnane-18-acid are reacted in 1.5 liters of cyclohexane with lead tetraacetate and iodine as described in Example 2, Part (a). When the crude product obtained as described in that example is crystallized from benzene, it yields the pure 18:20-lactone of 3β-acetoxy-5α-chloro-6β:19-oxido-20β-hydroxy-5α-pregnane-18-acid melting at 229 to 234° C. Optical rotation $[α]_D = −48.3°$ (in chloroform).

When the latter product is hydrolyzed with potassium carbonate in methanol it yields the 18:20-lactone of 3β:20β-dihydroxy-5α-chloro-6β:19-oxido - 5α - pregnane-18-acid which is directly oxidized with chromic acid+sulfuric acid in acetone at 0° C. to the crude 18:20-lactone of 3-oxo-5α-chloro-6β:19-oxido - 20β - hydroxy - 5α-pregnane-18-acid.

The 5α-chloro-6β-hydroxy compound used as starting material is obtained as described in Example 1, Part (a), by adding hypochlorous acid on to the 18:20-lactone of Δ⁵-3β-acetoxy - 20β - hydroxy-pregnene - 18 - acid; this compound is prepared by treating Δ⁵-3β-acetoxy-20β-hydroxy-pregnene with lead tetraacetate and iodine in boiling cyclohexane and subsequent oxidation with chromium trioxide and pyridine with addition of silver chromate at 60° C. After having been recrystallized from methylene chloride+ether the pure 18:20-lactone of 3β-acetoxy-5α-chloro-6β-hydroxy-20β - hydroxy-5α - pregnane-18-acid melts at 227 to 228° C. Optical rotation $[α]_D = −48.3°$ (in chloroform).

*Example 6*

3 grams of 3β-acetoxy-5α-chloro-6β-hydroxy-16:17α-oxido-20-oxo-5α-pregnane are reacted as described in Example 2, Part (a), with lead tetraacetate and iodine in cyclohexane, to yield 3.5 grams of a crude product which on recrystallization from methylene chloride+ether yields 3β - acetoxy - 5α - chloro - 6β:19;16:17α-bioxido-20-oxo-pregnane melting at 230 to 233° C. Optical rotation $[α]_D = +36.3°$ (in chloroform).

Hydrolysis of this compound with potassium carbonate in methanol yields the crude 3β-hydroxy-5α-chloro-6β:19;16:17α-bisoxido-20-oxo-5α-pregnane (melting at 241 to 247° C.).

The 5α-chloro compound used as starting material is prepared by adding hypochlorous acid on to the known Δ⁵-3β-acetoxy-16:17α-oxido-20-oxo-pregnene as described in Example 2, Part (a). After recrystallization from acetone+hexane the resulting pure 3β-acetoxy-5α-chloro-6β-hydroxy-16:17α-oxido-20-oxo-5α-pregnane melts at 194 to 198° C. Optical rotation $[α]_D = −7.8°$ (in chloroform).

*Example 7*

A suspension of 17.5 grams of lead tetraacetate and 8.0 grams of calcium carbonate in 800 cc. of cyclohexane is first heated for 30 minutes to boiling point while stirring. 4.0 grams of 3β:11α:20β-triacetoxy-5α-chloro-6β-hydroxy-pregnane and 5.13 grams of iodine are then added and the mixture is heated for another hour to boiling point while being stirred and exposed to a 500 watt lamp, the color of the iodine slowly disappearing. After the reaction time has expired, the mixture is cooled, the insoluble salts are separated by filtration and the filtrate is washed with 10% sodium thiosulfate solution and with water. The aqueous solutions are extracted once more with ether and the combined organic solutions are dried and evaporated in a water-jet vacuum. The partly crystallizing crude product obtained (6.146 grams) is dissolved in 100 cc. of glacial acetic acid to reduce the starting material contained therein and the solution is stirred for 2 hours at 80° C. after adding 10 grams of zinc dust. The undissolved zinc is then filtered off and the filtrate is diluted with methylene chloride and washed with sodium bicarbonate solution and with water. 4.253 grams of crude product are obtained from the dried organic solutions after evaporation. By crystallization from ether, 923 mg. of 3β:11α:20β-triacetoxy-5α-chloro-6β:19-oxido-pregnane having a melting point of 228–230° C. can be separated therefrom (conversion from 185° C.); $[α]_D = −6.2°$ (in chloroform); IR bands inter alia at 5.77μ and 8.09μ (acetates), 9.63μ; 9.75μ and 10.84μ.

The mother liquor is evaporated to dryness and chromatographed on 100 grams of aluminum oxide. With 900 cc. of hexane, 900 cc. of hexane-benzene mixture (4:1) only 81 mg. of oily by-products are eluted. From the fractions eluted with another 300 cc. of benzene-hexane mixture (2:1) there are obtained by crystallization from aqueous methanol 119 mg. of Δ⁵-3β:11α:20β-triacetoxypregnene, which has been produced by zinc reduction of the 5α-chloro-6β-hydroxy compound. The following 300 cc. of benzene-hexane mixture (2:1) and 300 cc. of benzene contain mixtures of substances, while the evaporation residues of the fractions eluted with 900 cc. of benzene and 600 cc. of benzene-ethyl acetate mixture (9:1), when crystallized from ether, yield a further 411 mg. of the above-described 3β:11α:20β-triacetoxy-5α-chloro-6β:19-oxido-pregnanes. Finally from the fractions eluted with benzene-ethyl acetate mixture (1:1), with ethyl acetate and with methanol, 718 mg. of 3β:11α:20β-triacetoxy-5α-chloro-6β:19-oxido-19-hydroxypregnane having a melting point of 232–233° C. are obtained by crystallization from methylene chloride-ether; $[α]_D^{25} = -13.2°$ (in chloroform-alcohol in a ratio 1:1). IR bands inter alia at 2.79μ and 2.93μ (OH), 5.78μ and 8.12μ (acetates); 9.30μ; 9.70μ, 10.55μ and 10.91μ.

The 3β:11α:20β-triacetoxy-5α-chloro-6β-hydroxy-pregnane employed as starting material is prepared as follows: 18.71 grams of Δ4-3-oxo-11α-acetoxy-20β-hydroxypregnene are heated to boiling point in 100 cc. of isopropenyl acetate after adding 0.1 cc. of concentrated sulfuric acid. After one hour, 10 cc. of solvent are distilled off, boiling is then continued for another hour under reflux and the solution is then evaporated in a water-jet vacuum after adding 500 mg. of anhydrous sodium acetate. The residue is taken up in methylene chloride and the solution is washed with water, dried and once more evaporated. From the crude product (21 grams), 13.66 grams of pure Δ3:5-3:11α:20β-triacetoxy-pregnatriene having a melting point of 145–150° C. are obtained by crystallization from ether; $[α]_D^{25} = -144.3°$ (in chloroform); UV maximum at 235 mμ (ε=19,500); IR bands inter alia at 5.77μ (with shoulder at 5.68μ) and 8.16μ (acetates), 9.76μ; 10.40μ and 10.83μ.

12.0 grams of this enol acetate are dissolved in 900 cc. of alcohol. A solution of 6.0 grams of sodium borohydride in 120 cc. of 70% aqueous alcohol is added to the solution, which has been cooled to +5° C., and the reaction mixture is allowed to stand for 3 days at 0° C. 10 cc. of glacial acetic acid are then dropped in while stirring and the reaction mixture is concentrated in a water-jet vacuum to about 100 cc., diluted with methylene chloride and washed with water. 11.52 grams of a residue are obtained from the dried methylene chloride solution after evaporation and from this 9.78 grams of pure Δ5-3β-hydroxy-11α:20β-diacetoxypregnene can be isolated by crystallization from ether. The compound, after being dissolved once more in methanol and allowed to crystallize, melts at 162–165° C. $[α]_D^{25} = -69.6°$ (in chloroform); IR bands inter alia at 2.74μ (OH), 5.78μ and 8.09μ (acetates); 9.76μ and 10.45μ.

9.78 grams of this compound are allowed to stand overnight at room temperature in 50 cc. of pyridine and 30 cc. of acetic anhydride. The reaction mixture is then evaporated to dryness in a water-jet vacuum and the residue is crystallized from aqueous methanol. 10.1 grams of Δ5-3β:11α:20β-triacetoxypregnene having a melting point of 141–143° C. are obtained; $[α]_D^{25} = -59.4°$ (in chloroform). IR bands inter alia at 5.78μ and 8.09μ (acetates), 9.76μ; 10.44μ and 10.93μ.

3.0 grams of Δ5-3β:11α:20β-triacetoxypregnane are dissolved in 180 cc. of ether. After adding 180 cc. of water and 3.0 grams of chlorinated lime, the reaction solution is thoroughly stirred and 2.1 cc. of glacial acetic acid are then added. The two phases are then well mixed for 40 minutes with a vibromixer, 50 cc. of 2% sodium thiosulfate solution and 50 cc. of 5% potassium iodide solution are then added, separation is carried out and the organic solution is washed several times with water. 1.78 grams of 3β:11α:20β-triacetoxy-5α-chloro-6β-hydroxypregnane having a melting point of 225–227° C. are obtained from the evaporation residue (3.417 grams) by crystallization from ether; $[α]_D^{25} = -43.2°$ (in chloroform); IR bands inter alia at 2.74μ (OH); 5.78μ and 8.09μ (acetates); 9.30μ; 9.56μ; 9.75μ and 10.45μ.

Example 8

250 mg. of 3β:11α:20β-triacetoxy-5α-chloro-6β:19-oxidopregnane are dissolved in 50 cc. of methanol and the solution is boiled under reflux for 10 hours after adding 500 mg. of potassium carbonate and 12.5 cc. of water. 1.0 cc. of glacial acetic acid is then added, the mixture is evaporated to about 15 cc. in a water-jet vacuum and diluted with methylene chloride and water, separation is carried out and washing to neutrality with dilute sodium bicarbonate solution, and the organic solution is dried and evaporated. 160 mg. of crystallized 3β:11α:20β-trihydroxy-5α-chloro-6β:19-oxidopregnane, which is precipitated from methanol-ether in methanol-containing crystals having a melting point of 264–266° C., are obtained; $[α]_D^{25} = -25.9°$ (in chloroform). IR bands inter alia at 3.03μ (OH); 9.15μ; 9.63μ; 9.80μ and anotheer 10 bands between 10.24μ and 12.60μ (in Nujol).

295 mg. of crude 3β:11α:20β-trihydroxy-5α-chloro-6β:19-oxidopregnane are dissolved in 100 cc. of acetone and stirred at 0° C. for 15 minutes after adding 1.0 cc. of a 26.6% solution of chromium trioxide in sulfuric acid of 42% strength. 3.0 cc. of isopropanol are then added, stirring is continued for another 5 minutes at 0° C., a solution of 2.0 grams of crystalline sodium acetate in 10 cc. of water is added and the reaction mixture is concentrated to about 30 cc. in a water-jet vacuum and diluted with methylene chloride and the organic solution is washed with water, dried and evaporated (residue: 288 mg.). The 3:11:20-trioxo-5α-chloro-6β:19-oxidopregnane obtained in this way melts, after being dissolved in methylene chloride-ether and allowed to crystallize, within a few degrees between 130 and 170° C. with decomposition, according to the rate of heating; $[α]_D^{25} = +167°$ (in chloroform); IR bands inter alia at 5.84μ (with shoulder at 5.80μ); 6.68μ; 7.38μ; 8.55μ; 9.12μ; 9.68μ and 10.56μ.

Example 9

500 mg. of 3β:11α:20β-triacetoxy-5α-chloro-6β:19-oxidopregnane are dissolved in 100 cc. of methanol and allowed to stand for 18 hours at 25° C. after adding a solution of 1.0 gram of potassium carbonate in 25 cc. of water. 2 cc. of glacial acetic acid are then added, the reaction mixture is concentrated to about 20 cc. in a water-jet vacuum and diluted with methylene chloride and the organic solution is washed with water, sodium bicarbonate solution and water. From the residue of the dried methylene chloride solution there are obtained by crystallization from aqueous methanol 110 mg. of 3β-hydroxy-5α-chloro-6β:19-oxido-11α:20β-diacetoxypregnane in hydrous crystals which lose water of crystallization at 114–116° C. and melt at 168–170° C.; $[α]_D^{25} = -20.2°$ (in chloroform); IR bands inter alia at 2.78μ (OH); 5.77μ and 8.11μ (acetates); 9.52μ; 9.78μ and 10.93μ.

The mother liquor which, in addition to further amounts of the above compound, also contains 3β:20β-dihydroxy-5α-chloro-6β:19-oxido-11α-acetoxypregnane, is evaporated to dryness and the residue (340 mg.) is dissolved in 30 cc. of acetone. 1.0 cc. of a 26.6% solution of chromium trioxide in sulfuric acid of 42% strength is added to the solution, which has been cooled to 0° C., and stirring is carried out for 15 minutes at 0° C. 3.0 cc. of isopropanol are then added, dilution with methylene chloride is carried out after another 5 minutes and the solution is washed several times with water. The dried methylene chloride solution is evaporated to dryness and the residue (312 mg.) contains the 3-oxo-5α-chloro-6β:19-oxido-11α:20β-diacetoxypregnane and 3:20-dioxo-5α-chloro-6β:19-oxido-11α-acetoxypregnane.

Example 10

A suspension of 8.75 grams of lead tetraacetate and 4.0 grams of calcium carbonate in 200 cc. of carbon tetrachloride is heated for 10 minutes to boiling point.

2.0 grams of 3β:11α:20β-triacetoxy-5α-chloro-6β-hydroxypregnane and 2.57 grams of iodine are then added and the boiling reaction mixture is stirred, while exposed to a 500 watt lamp, until the iodine color has disappeared (about 30 minutes). The cooled mixture is filtered and the filtrate is washed with sodium thiosulfate solution and water, dried and evaporated. The residue (2.60 grams) is dissolved in benzene and filtered through a column containing 60 grams of aluminum oxide. From the residues of the fractions eluted with 1000 cc. of benzene 7.17 mg. of 3β:11α:20β-triacetoxy-5α-chloro-6β:19-oxidopregnane having a melting point of 228–230° C. are obtained by crystallization from ether. From the fractions eluted with 600 cc. of benzene-ethyl acetate mixture (1:1) and with 200 cc. of ethyl acetate 339 mg. of 3β:11α:20β-triacetoxy-5α-chloro-6β:19-oxido-19-hydroxypregnane having a melting point of 232–233° C. are obtained after crystallization from ether.

*Example 11*

A solution of 1.48 grams of crude 3β:11α:20β-trihydroxy-5α-chloro-6β:19-oxidopregnane in 430 cc. of acetone is cooled to 5° C., mixed with 4.3 cc. of a 26.6% solution of chromium trioxide in sulfuric acid of 42% strength, and the whole is stirred for 1 hour at 0 to 5° C. 13 cc. of isopropanol are then dropped in and then a solution of 4.3 grams of potassium acetate in 45 cc. of water, the whole is concentrated in a water-jet vacuum to about 35 cc. and repeatedly extracted with methylene chloride. The extracts are washed with water and dried, to yield 1.352 grams of crude 3:11:20-trioxo-5α-chloro-6β:19-oxidopregnane.

What is claimed is:

1. 3-oxygenated 5α-halogen-6β:19-oxido-pregnanes of the formula

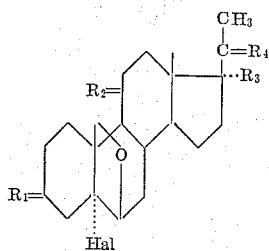

wherein
$R_1$ stands for a member selected from the group consisting of oxo, hydroxy together with hydrogen and acyloxy together with hydrogen,
$R_2$ stands for a member selected from the group consisting of hydrogen, oxo, hydroxy together with hydrogen and acyloxy together with hydrogen,
$R_3$ stands for a member selected from the group consisting of hydrogen, hydroxy, acyloxy and a 16:17α-oxido group,
$R_4$ stands for a member selected from the group consisting of oxo, hydroxy together with hydrogen and acyloxy together with hydrogen and
Hal stands for a halogen atom with a molecular weight above 30.

2. 3β:20β-diacetoxy-5α-chloro-6β:19-oxido-pregnane.
3. 3β:20β-dihydroxy-5α-chloro-6β:19-oxido-pregnane.
4. 3β-acetoxy-5α-chloro-6β:19-oxido-20-oxo-pregnane.
5. 3β:17α-diacetoxy-5α-chloro-6β:19-oxido-20-oxo-pregnane.
6. 3β-acetoxy-5α-chloro-6β:19-oxido-17α-valerianyloxy-20-oxo-pregnane.
7. 3β:17α-dihydroxy-5α-chloro-6β:19-oxido-20-oxo-pregnane.
8. 3β-acetoxy-5α-chloro-6β:19-oxido-17α-hydroxy-20-oxo-pregnane.
9. 3β-hydroxy-5α-chloro-6β:19-oxido-17α-acetoxy-20-oxo-pregnane.
10. 3:20-dioxo-5α-chloro-6β:19-oxido-17α-acetoxy-20-oxo-pregnane.
11. 3β-acetoxy-5α-chloro-6β:19;16α:17α-bisoxido-20-oxo-pregnanes.
12. 3β-hydroxy-5α-chloro-6β:19;16α:17α-bisoxido-20-oxo-pregnane.
13. 3β:11α:20β-triacetoxy-5α-chloro-6β:19-oxido-pregnane.
14. 3β:11α:20β-trihydroxy-5α-chloro-6β:19-oxido-pregnane.
15. 3:11:20-trioxo-5α-chloro-6β:19-oxido-pregnane.
16. 3β-hydroxy-5α-chloro-6β:19-oxido-11α:20β-diacetoxy-pregnane.
17. 3β:20β-dihydroxy-5α-chloro-6β:19-oxido-11α-acetoxy-pregnane.
18. 3-oxo-5α-chloro-6β:19-oxido-11α:20β-diacetoxy-pregnane.
19. 3:20-dioxo-5α-chloro-6β:19-oxido-11α-acetoxy-pregnane.
20. 3β-acetoxy-5α-chloro-6β:19-oxido-17α-capronyloxy-20-oxo-pregnane.
21. 3β-hydroxy-5α-chloro-6β:19-oxido-17α-capronyloxy-20-oxo-pregnane.
22. 3:20-dioxo-5α-chloro-6β:19-oxido-17α-capronyloxy-pregnane.

References Cited in the file of this patent
UNITED STATES PATENTS
3,033,862    Ringold et al.             May 8, 1962